(No Model.) 3 Sheets—Sheet 2.
T. R. DALLMEYER & F. BEAUCHAMP.
PHOTOGRAPHIC SHUTTER.
No. 436,404. Patented Sept. 16, 1890.
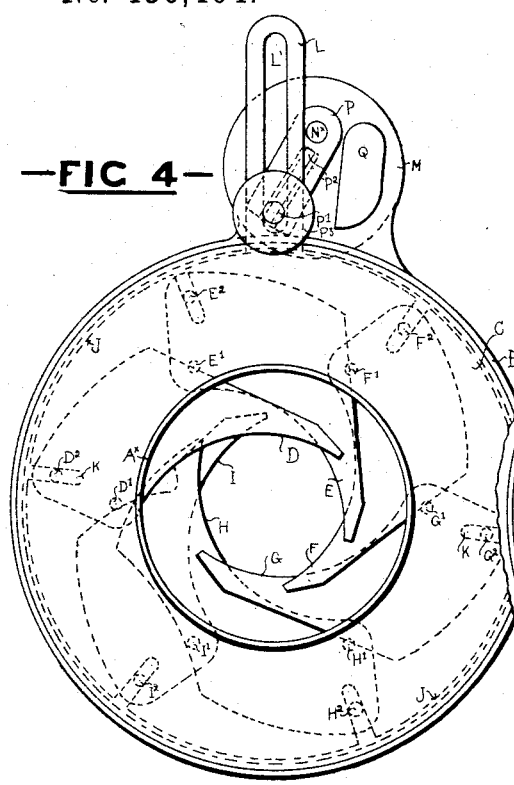
FIG 4
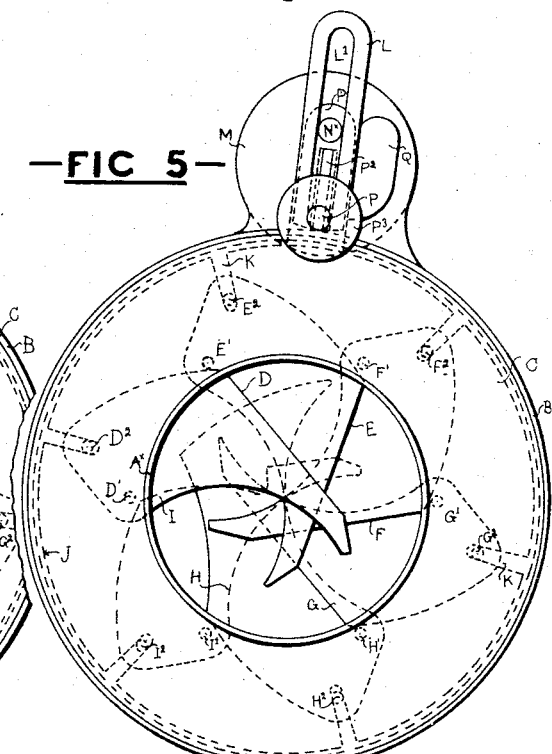
FIG 5
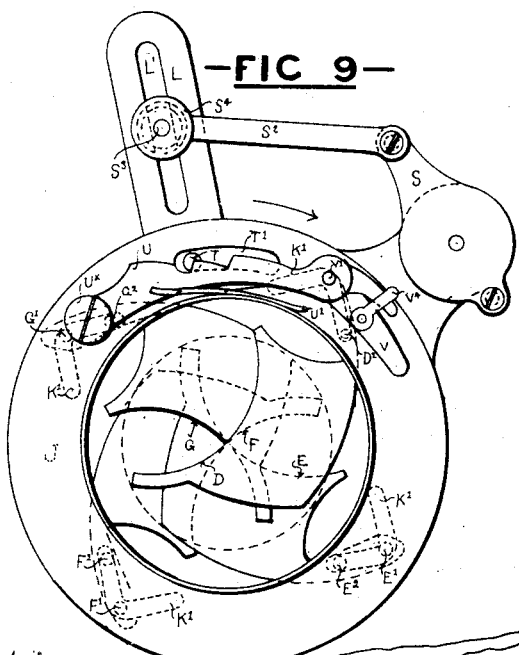
FIG 9
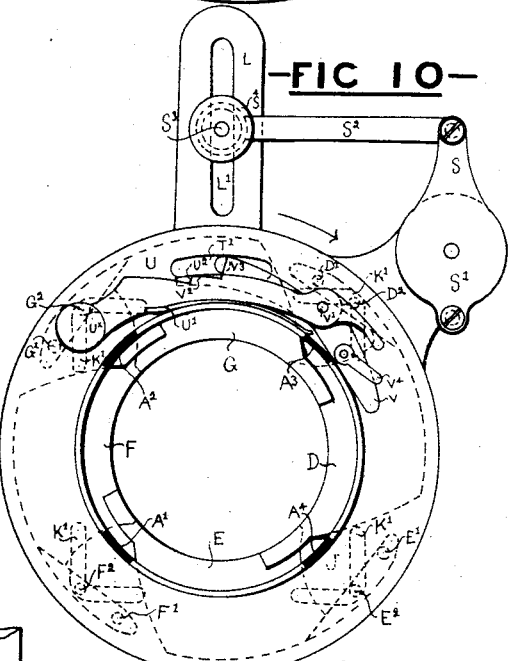
FIG 10
FIG 11
Witnesses
Chas. A. Mills
Herman Nicefield
Inventors
Thos. R. Dallmeyer
and Francis Beauchamp
By Wm. H. Babcock
Atty
THE NORRIS PETERS CO., PHOTO-LITHO., WASHINGTON, D. C.

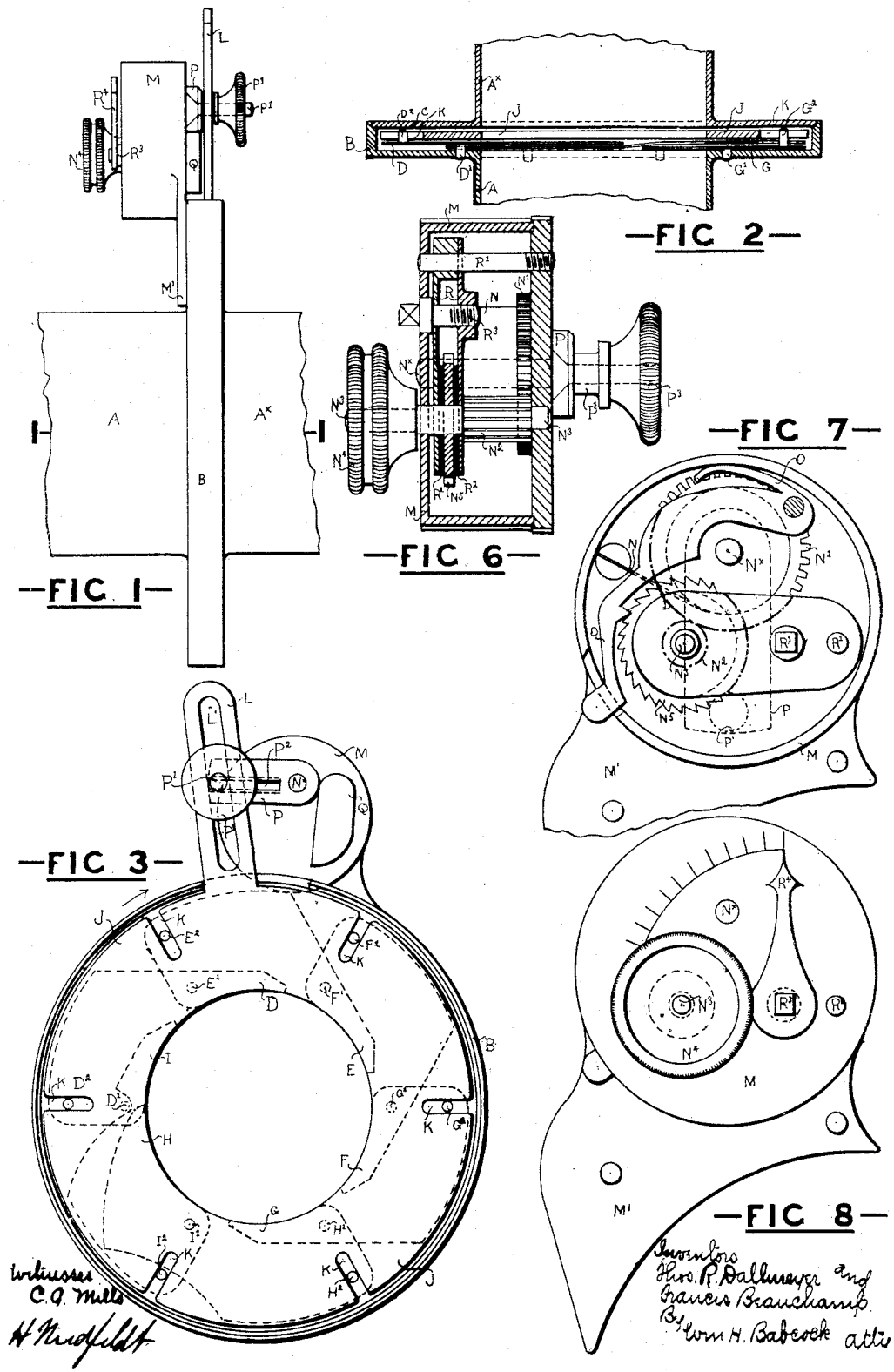

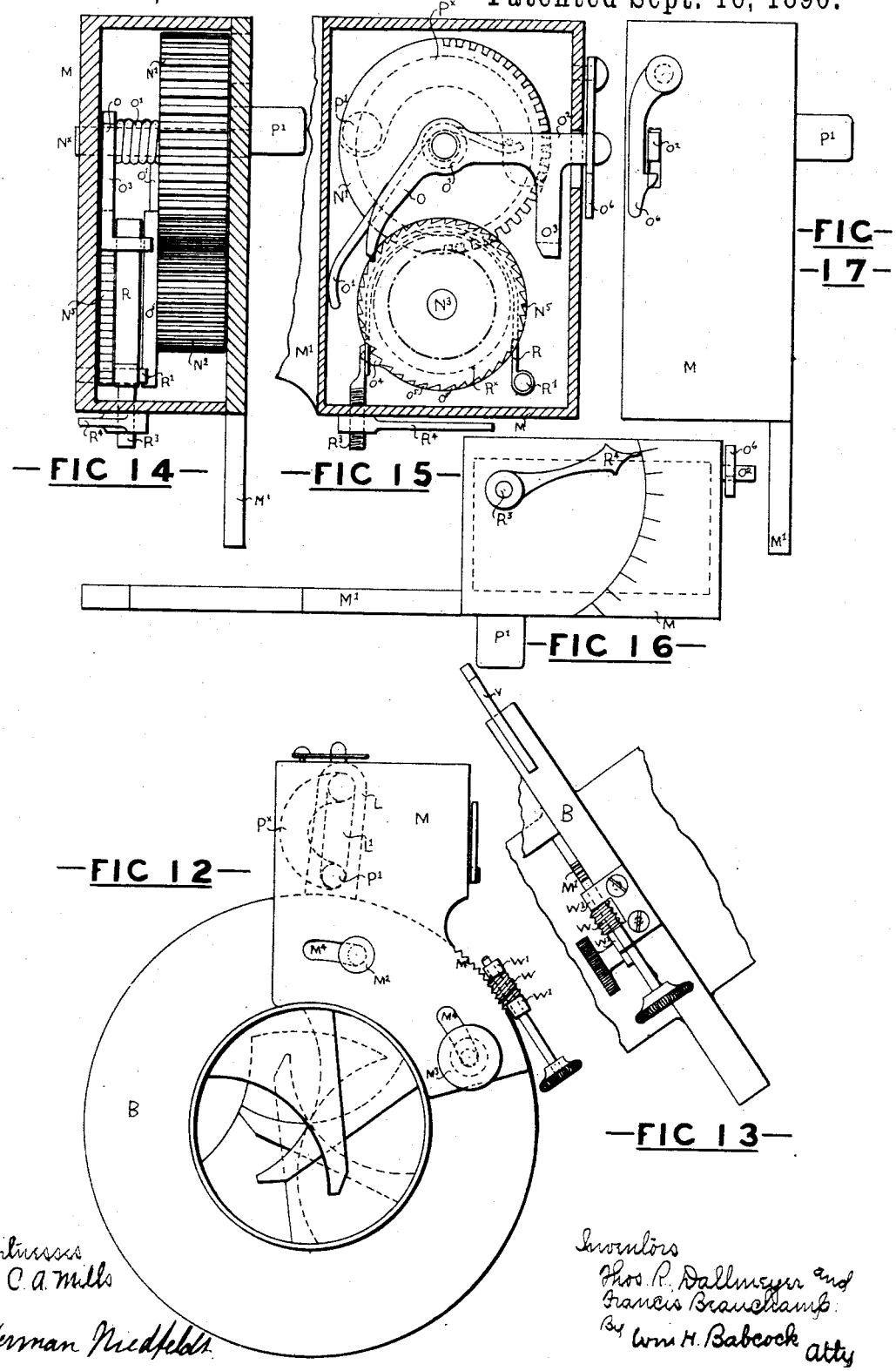

UNITED STATES PATENT OFFICE.

THOMAS R. DALLMEYER, OF LONDON, AND FRANCIS BEAUCHAMP, OF TOTTENHAM, ENGLAND.

PHOTOGRAPHIC SHUTTER.

SPECIFICATION forming part of Letters Patent No. 436,404, dated September 16, 1890.

Application filed June 26, 1888. Serial No. 278,210. (No model.)

*To all whom it may concern:*

Be it known that we, THOMAS RUDOLPH DALLMEYER, optician, residing at 25 Newman Street, London, in the county of Middlesex and Kingdom of Great Britain, and FRANCIS BEAUCHAMP, engineer, residing at High Cross, Tottenham, in the county of Middlesex and Kingdom of Great Britain, both subjects of the Queen of Great Britain, have invented certain new and useful Improvements in Photographic Lens-Shutters, of which the following is a specification.

Our invention relates to improvements in the shutters employed in connection with photographic lens-mounts for the purpose of admitting light to the camera for a greater or less length of time and for excluding light therefrom altogether when required.

Our improvements relate more especially to arrangements and constructions of shutters which open and close from and to the center in such manner that the opening produced by such shutters is always central or concentric with the center of the lens-mount and more or less approximating to a circular or regular polygonal form whether fully open or partially closed.

Our invention consists of certain improvements in the details of the shutter-operating devices, substantially as hereinafter set forth and claimed.

In the drawings hereto annexed, Figure 1 is a side view of part of a lens-mount with the shutter therein constructed in accordance with our invention. Fig. 2 is a longitudinal section of same, taken on line 1 1 of Fig. 1. Fig. 3 is an elevation of the circular box containing the shutter mechanism, with the disk J and tube $A^\times$ (seen in Fig. 2) removed, the shutter being shown wide open. Fig. 4 is an elevation with the shutter partially closed, and Fig. 5 is a similar view with the shutter completely closed.

A represents part of the tube of the lens-mount.

B is a circular box or chamber at the end of the tube A, containing the shutter. C is a cover to the said box B.

$A^\times$ is a tube formed with or secured in the center of the disk C and forming a prolongation of the tube A.

D, E, F, G, H, and I are metallic leaves or chopper-shaped pieces, which together form the shutter. These leaves turn, respectively, on fulcrum-pins D', E', F', G', H', and I', which take into holes in the bottom of the box B. These leaves have respectively fixed to them on the side opposite to the fulcrum-pins other pins $D^2$, $E^2$, $F^2$, $G^2$, $H^2$, and $I^2$.

J is a disk fitting easily into and turning to a limited extent in the box B. It is provided with radial slots K, corresponding to and receiving the pins $D^2$, $E^2$, $F^2$, $G^2$, $H^2$, and $I^2$.

L is a slotted arm projecting from the disk J through an opening in the side of the box B. The inner edges of the aforesaid leaves are preferably formed to the arc of a circle, so that when they are opened out to their widest extent, as shown in Fig. 3, their said inner edges form a complete circle, as shown. It will now be understood that by turning the disk J in the direction of the arrow in Fig. 3 by means of the arm L the slots K in the disk J press against the pins $D^2$, $E^2$, $F^2$, $G^2$, $H^2$, and $I^2$, causing the corresponding leaves to turn inward on their fulcrum-pins D', E', F', G', H', and I', so that the inner segmental edges of such leaves intersect each other, so as to form an opening which gradually decreases in size as the arm L is moved, but which is always concentric to or symmetrical with regard to the center and approximates more or less to the circular form.

In Fig. 4 the leaves are shown partly turned and intersecting each other, so as to form a shutter about half-closed, and in Fig. 5 they are shown turned to such an extent as to intersect in such manner as to form an entirely-closed shutter. When the arm L is moved in a direction opposite to the arrow in Fig. 3, the slots K act on the pins $D^2$, $E^2$, $F^2$, $G^2$, $H^2$, and $I^2$, so as to turn the leaves in the opposite direction and thereby to form a gradually-enlarging opening.

The opening and closing of these shutters, in order to give the necessary exposure to the picture in the camera, may be effected by moving the arm L by hand; but we prefer to move it by automatic means, and for that purpose we employ the mechanism shown at the upper part of Figs. 1, 3, 4, and 5 and to a scale twice as large in Figs. 6, 7, and 8. Fig. 6 is a section of this apparatus. Fig. 7 is an elevation of the same with the cover of the containing-case removed, and Fig. 8 is a front view. M is a case secured by a flange M' to the back of the box B. N is an ordinary clock-work spring, one end of which is connected to the arbor $N^\times$ and the other end to the case M. This arbor $N^\times$ carries a spur-wheel N', gearing with a pinion $N^2$ on an arbor $N^3$, having a milled handle $N^4$ external to the case M. The arbor $N^3$ has secured on it the ratchet-wheel $N^5$, which is prevented from turning by the spring-pawl O. P is a crank-arm external to the case M and fixed on the arbor $N^\times$. The crank-pin P' of this crank takes into the slot L' of the arm L. By turning the milled handle $N^4$ the arbor $N^\times$ may be turned partly round, winding up the spring N and turning the crank P into a position diametrically opposite to that shown in Fig. 5, the shutter being closed, as shown in that figure. The spring-pawl O will hold the arbor $N^\times$ and crank P in that position by means of the ratchet-wheel $N^5$ until it is required to open and close the shutter to give the needful exposure. Then by pressing the pawl O out of gear with the ratchet-wheel $N^5$ the arbor $N^\times$ is released to the action of its spring, which causes it to make a partial revolution which brings the crank P back into the position shown in Fig. 5. As the crank-pin P' passes from its upper position into that shown in Fig. 3, it causes the arm L to move from the position shown in Fig. 5 into the position shown in Fig. 3—that is, to open the shutter to its full extent. Then the further movement of the crank-pin P' into the position shown in Fig. 5 causes the arm L to move back from the position shown in Fig. 3 to that shown in Fig. 5—that is, to close the shutter again. Q is a stop to prevent the crank P from going beyond the position shown in Fig. 5. Thus the half-revolution of the crank P causes the shutter to open and close. The speed with which this opening and closing action is effected may be regulated within certain limits by means of a friction-brake arrangement (shown in Figs. 6 and 7) arranged to act on the ratchet-wheel $N^5$. R is a kind of pinchers, the closed end of which is secured by the pin R' and the open end of which embraces between its branches the aforesaid ratchet-wheel $N^5$, leather washers $R^2$ being preferably interposed between the branches of the pinchers and the said ratchet-wheel. $R^3$ is a screw, the head of which extends to the outside of the case M, and has on it an index-pointer $R^4$, moving over a graduated scale, as shown in Fig. 8. By tightening up or slackening this screw $R^3$ more or less by means of the index-pointer $R^4$ frictional resistance may be imparted to the ratchet-wheel $N^5$, and the speed of its revolution, and consequently that of the arbor $N^\times$ and crank P, thereby regulated to a certain extent.

Although it is necessary always to close the shutter entirely, it is sometimes desirable to open it only partially, so as not to admit the full quantity of light. This is effected by making the crank-pin P' adjustable in the crank P—that is to say, by securing the crank-pin P' at various points in the slot $P^2$ of the crank P by means of the clamping-nut $P^3$ its throw or stroke may be increased or reduced at pleasure, and thereby the amount to which the arm L is moved, and consequently the amount to which the shutter is opened, while the complete closing is effected whatever be the position of the crank-pin P' on the crank-arm P, as shown in Fig. 5.

Figs. 9, 10, and 11 show a modification of the above-described arrangements. In this case the shutter is shown composed of four leaves D, E, F, and G, instead of six, and the tube A, instead of being divided, as in Figs. 1 to 5, is continuous, being merely slotted for the passage of the leaves through it, as shown in Fig. 10, the continuity of the tube being preserved by the parts A' $A^2$ $A^3$ $A^4$. These leaves turn on pivots D', E', F', and G', and the disk J, instead of having radial slots for actuating the shutter-leaves, has L-shaped slots K', placed as shown in Figs. 9 and 10, the effect of which is that a movement of the arm L in either direction both opens and closes the shutter-leaves.

To effect the movement of the arm L automatically, the arm S is urged by a spring contained in the box S' in the direction of the arrow. This arm S is connected by the link $S^2$ with the arm L by means of a stud $S^3$, adjustable in the slot L' by means of the clamping-nut $S^4$. T is a stud fixed on the arm L and passing through the slot T' in the box. U is a latch-lever pivoted at $U^\times$, pressed by a spring U' toward the stud T. When the arm L is in the position shown in Fig. 9 and the shutter is closed, the stud T is latched by the part $U^2$ of the latch-lever U, so that the spring-urged arm S cannot draw the arm L to the right; but if the latch-lever U be pressed down the stud T is liberated and the spring-urged arm S is then free to act and draws the arm L to the right, turning the disk J and causing the slots K' therein to turn the shutter-leaves first outward, so as to open the shutter, and then inward, so as to close the same again. The time occupied in effecting this opening and closing of the shutter can be regulated to a certain extent by moving the stud $S^3$ up or down in the slot L'. Raising it increases the time occupied in opening and closing, and lowering it decreases the time.

When it is required to obtain a comparatively long exposure—that is to say, to hold the shutter open longer than the arrangements above described will admit of—we apply a second latch V to the latch-lever U. Such latch V turns on a fulcrum-pin V' on the latch-lever U, and has a tail-piece $V^2$ and projecting part $V^3$. It also carries a bridle-piece $V^4$, by which it can be connected to or coupled with the latch-lever U, as shown in Fig. 9. When the two latches are so coupled together, the latch V is inoperative, and the releasing of the latch U from the stud T allows the arm L to effect the opening and then the immediate closing of the shutter, as above described; but when it is required to hold the shutter open for a certain length of time and then to close it the bridle-piece V$^4$ is turned into the position shown in Fig. 10, and the outer end of the latch V is pressed down, elevating the projecting part V$^3$ and bringing the tail-piece V$^2$ against the stud T. A slight further pressure on the outer end of the latch V releases the part U$^2$ of the latch-lever U from the stud T, Fig. 9, and the arm L then moves into the position shown in Fig. 10, with the shutter open. The stud T, coming against the part V$^3$ of the latch V, holds the arm L in that position until the outer end of the latch V is released, when the stud T presses the somewhat inclined surface of the projection V$^3$ downward, and is thereby released, and the arm L completes its movement to the right, closing the shutter.

Figs. 12, 13, 14, 15, 16, and 17 illustrate an arrangement whereby the shutter may be made to serve not only as a shutter, but also as a diaphragm or stop with variable size of aperture, and with arrangements whereby the speed of opening and closing may be regulated within certain limits, and whereby the shutter may be held open for any required length of time. Fig. 12 is an end view of a lens-mount, showing the shutter closed. Fig. 13 is a partial plan of Fig. 12; and Figs. 14, 15, 16, and 17 are detail views to a larger scale of the apparatus for regulating the time and for holding the shutter open.

The amount to which the shutter is opened is regulated in the following way: M is a case containing clock-work arrangements which actuate a crank-pin P' in a manner somewhat similar to that already described in reference to Figs. 3, 4, and 5. This crank-pin passes through the semicircular slot P$^\times$ in the side of the case M and takes into the slot L' in the arm L. The case M is adjustable circumferentially to a limited extent on the box B by means of the tangent-screw W gearing into teeth on the edge of the flange M' of the case M and turning in bearings W', fixed on the edge of the box B. The flange M' is guided by screws M$^2$ M$^3$, passing through slots M$^4$, and can be clamped in place by the milled screw M$^3$. In the position shown in Fig. 12 the crank-pin P is free to make a complete half-revolution in the slot P$^\times$, and therefore to move the arm L to the left in the figure sufficiently to open the shutter to its fullest extent; but if the case M be moved to the right in Fig. 12 the crank-pin P' is no longer able to traverse the entire length of the slot P$^\times$, because it brings the arm L against its stop in the position shown in Fig. 12 before it can itself reach either the upper or lower end of the slot P$^\times$—that is to say, the crank-pin P' can only describe a segment of the half-circle, the versine of which varies according to the position of the case M on the box B. Consequently the arm L is only moved to the left in the same proportion, and therefore the shutter is only opened in like proportion. By these means the shutter may be used in place of a stop or diaphragm, the size of the aperture being varied to correspond to that which would be used if the ordinary diaphragm were employed. The same effect can be produced as before explained in connection with Figs. 3, 4, and 5 by making the crank-pin adjustable into various positions on the crank-arm.

The mechanism for operating the crank-pin P' consists of a spring-barrel and winding-gear somewhat similar to that shown in Figs. 6 and 7, similar letters of reference relating to like parts in Figs. 6, 7, 8, 14, 15, 16, and 17.

In the arrangements shown in Figs. 12 to 17 the brake mechanism for regulating the time occupied by the opening and closing of the shutter—that is, the length of exposure, when such is not required to be instantaneous—consists of a brake-strap R, preferably lined with leather, fixed to a pin R' at one end, passing half-round a brake-drum R$^\times$ on the axis N$^3$ of the ratchet-wheel N$^5$, and connected at the other end to a screw R$^3$, passing through the case M and having an index-pointer R$^4$ working as a nut thereon. This index moves over a graduated scale, as shown in Fig. 16, and by turning the said index the pressure of the brake-strap R on the brake-drum R$^\times$ may be varied so as to increase or decrease the time of exposure within certain limits.

In order to hold the shutter open during any required length of time, whether for the purpose of obtaining a long exposure or while focusing, we employ the trigger and retaining arrangements shown in Figs. 14, 15, 16, and 17. O is a pawl held in gear with the teeth of the ratchet-wheel N$^5$ by the spring O'. O$^2$ is an arm extending from the said pawl and terminating in a finger-piece just outside the case M. O$^3$ is another arm extending from the arm O$^2$ and bent at right angles, as shown in Fig. 14. O$^4$ is a stop on a disk O$^5$, secured on the ratchet-wheel arbor N$^3$. O$^6$ is a latch which prevents the arm O$^2$ moving beyond a certain distance when necessary, as hereinafter described. It will now be understood that if the latch O$^6$ be moved aside and the arm O$^2$ be pressed by its projecting finger-piece, so as to draw the pawl O out of gear with the ratchet-wheel N$^5$, the bent part of the arm O$^3$ will be brought into the path of the stop O$^4$ and the revolution of the arbor N$^3$ will be arrested when the said stop comes against the arm. The portion of a revolution made, however, by the arbor N$^3$ before it is stopped by the arm O$^3$ is sufficient to allow the crank-pin P' to revolve far enough to open the shutter to the extent defined by the adjustment of the case M on the box B or of the crank-pin in the slot of its crank, as the case may be, and so long as the arm O$^3$ is held forward, so as to prevent the stop O⁴ from passing, so long will the shutter be held open. If, however, the arm O³ be moved back far enough to release the stop O⁴, but not far enough to place the pawl O in gear with the ratchet-wheel N⁵, the arbor N³ will be free to continue its rotation and to allow the crank-pin P′ to complete its partial rotation and to close the shutter. The exact position of the arm O² to enable this to be done is defined by the latch O⁶, as when the arm O² bears against this latch the arbor N³ is free to revolve. This latch O⁶ therefore serves also as a means of defining the proper position of the arm O², and consequently of the pawl O when it is required to allow the crank-pin P′ to effect the opening and closing of the shutter uninterruptedly.

We claim—

1. In mechanism for operating camera-shutters, the device for effecting the movement of the shutter-actuating disk J automatically, consisting of the spring-actuated crank-pin P′, held and released by means of a ratchet-wheel N⁵ and a spring-pawl O and acting on an arm L of the said disk J, substantially as set forth.

2. The device for regulating within certain limits the time occupied in opening and closing the shutter, consisting of a friction-brake R, pressing against the side or periphery of a brake wheel or drum with a pressure adjustable by means of a screw R³, and an index-pointer R⁴, moving over a graduated scale, substantially as set forth.

3. The device for varying the throw of the crank-pin P′ and arm L, for the purpose set forth, consisting in the combination of crank P and its actuating attachment with the lens-mount, said crank being adjustable circumferentially on the lens-mount, substantially as described.

In testimony that we claim the foregoing as our invention we have signed our names in presence of two subscribing witnesses.

THOS. R. DALLMEYER.
F. BEAUCHAMP.

Witnesses:
G. F. WARREN,
*Notary Public, 17 Gracechurch Street, London.*
W. A. SMITH,
117 *Stoke Newington Road, London.*